Oct. 18, 1966   R. P. THOMPSON ET AL   3,279,883
DISTRIBUTING PURIFIED AIR
Filed Dec. 20, 1962   2 Sheets-Sheet 1
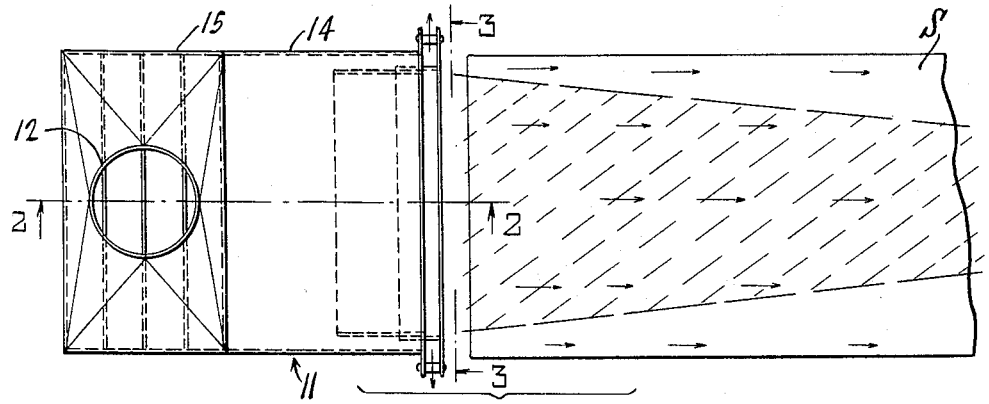
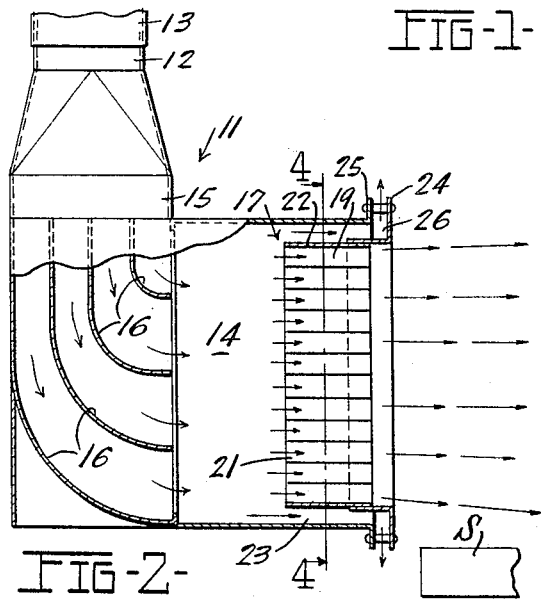
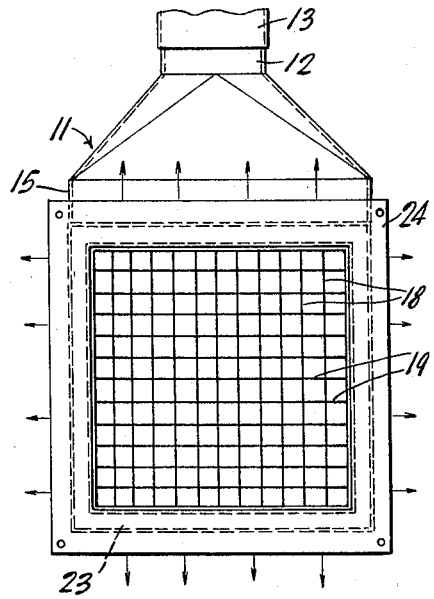
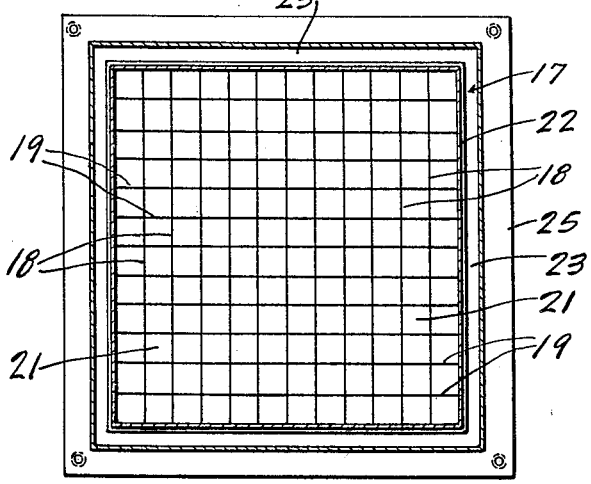
INVENTORS:
RAYMOND P. THOMPSON,
GERALD W. KNEPP,
GILBERT A. KELLEY.
BY
ATT'Y Oct. 18, 1966 R. P. THOMPSON ET AL 3,279,883
DISTRIBUTING PURIFIED AIR
Filed Dec. 20, 1962 2 Sheets-Sheet 2
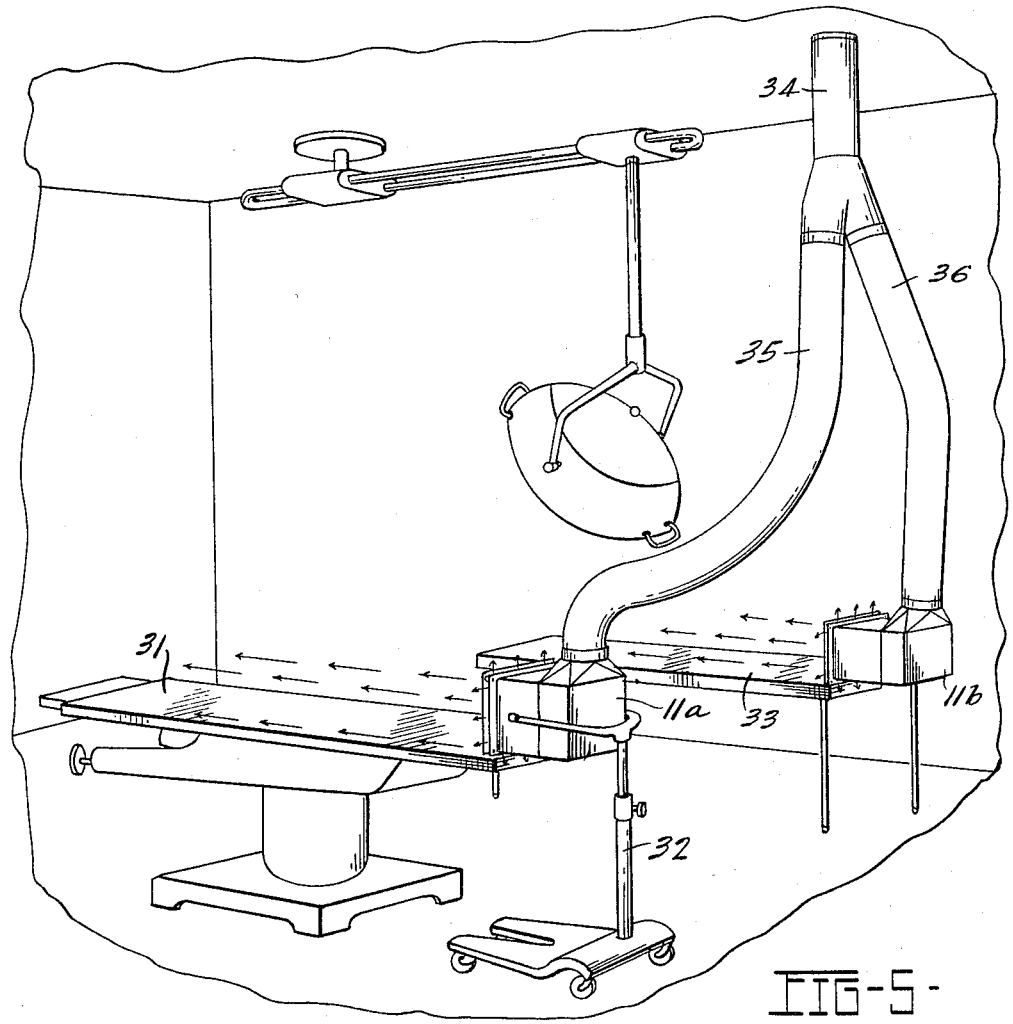
FIG-5-
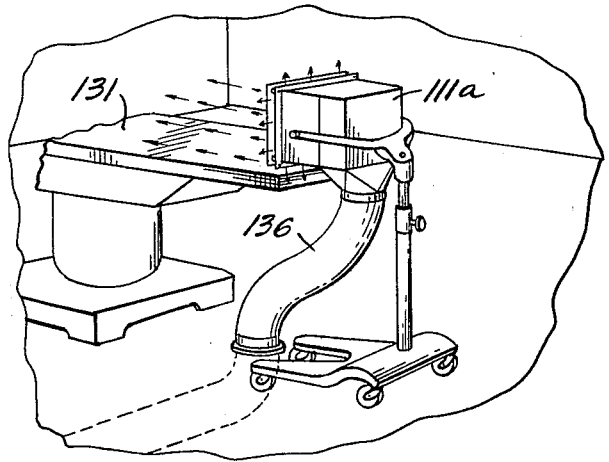
FIG-6-
INVENTORS:
RAYMOND P. THOMPSON,
GERALD W. KNEPP,
GILBERT A. KELLEY.
BY
Alfred L. Patmore Jr.
ATT'Y.

United States Patent Office 3,279,883
Patented Oct. 18, 1966

3,279,883
DISTRIBUTING PURIFIED AIR
Raymond P. Thompson, Toledo, Ohio, Gerald W. Knepp, Lambertville, Mich., and Gilbert A. Kelley, Toledo, Ohio, assignors to Midland-Ross Corporation, Toledo, Ohio, a corporation of Ohio
Filed Dec. 20, 1962, Ser. No. 246,228
13 Claims. (Cl. 21—53)

There are now commercially available various air purifying systems for killing, sterilizing, or removing bacteria from a stream of air for introduction into a space. Such air treatment might well be employed in instances where such activities as human surgery or food or pharmaceutical product packaging takes place within the space. One such air purifying system is that described in U.S. Patent 3,065,043 to G. A. Kelley wherein the stream of air is treated by intimately contacting it with a stream of an aqueous solution of a hygroscopic salt such as lithium chloride. The advantages of purifying the air supply to a space for such an activity are obvious. However, mere treating of the air prior to passing it into the space is not sufficient to obtain all the possible advantages in the use of purified air due to the fact that the treated air is contaminated with the bacteria generated by the personnel normally present within the space subsequent to its passage thereinto. It is, therefore, the object of this invention to provide means for introducing purified air into a space in such a manner as to maintain the air in at least a critical region within the space, such as the region surrounding an open incision in a hospital operating room, relatively uncontaminated from bacteria generated by personnel within the space. To accomplish this object it is necessary to devise means to inhibit the natural tendency of the introduced stream of purified air to entrain air from the surrounding air in the space because of the danger that the surrounding air is contaminated with bacteria generated by the personnel within the space. It is, therefore, a further object of the invention to provide means for introducing a stream of air into a space in such a manner as to inhibit entrainment of surrounding air in the space by the introduced stream.

For a further consideration of what is considered to be novel and inventive attention is directed to the following portion of the specification, the drawing, and the appended claims.

In the drawing:

FIGURE 1 is a plan view of an air distributor constructed in accordance with the present invention, shown in relationship to a surface over which it is desired to maintain a moving blanket of clean air free from mixing with air from the surroundings;

FIGURE 2 is an elevational sectional view taken on line 2—2 of FIGURE 1;

FIGURE 3 is a frontal view taken on line 3—3 of FIGURE 1;

FIGURE 4 is a sectional view taken on line 4—4 of FIGURE 2;

FIGURE 5 is a fragmentary perspective view showing an application for air distributors constructed in accordance with the present invention; and FIGURE 6 shows an alternate arrangement of the equipment of FIGURE 5.

Referring particularly to FIGURES 1–4 of the drawing there is shown an air distributor constructed in accordance with the present invention, which is indicated generally by numeral 11. Distributor 11 comprises wall means forming a cylindrical inlet connection portion 12, adapted to connect to air supply conduit 13, shown fragmentarily, a plenum chamber 14, and an intermediate connection 15 which, in units where inlet connection 12 and plenum chamber 14 do not have parallel axes, may be used to impart a turning effect to the air flowing therethrough. Disposed within connection 15 are a plurality of curved turning vanes 16 which serve to minimize turbulence arising from change in the direction of flow of the air stream and to more evenly distribute air flow throughout plenum chamber 14.

Disposed within plenum chamber 14 adjacent the outlet therefrom is a flow straightener, shown generally at 17, comprising a plurality of thin, evenly spaced, and vertically extending slats 18 and a plurality of similar, but horizontally disposed, slats 19 which intersect with vertical slats 18 and form, therewith, a plurality of flow passages 21 of generally square cross-section. Slats 18 and 19 are preferably of such a depth, with respect to the direction of flow, as to form flow passages 21 whose length is at least twice, and preferably about four times, the width thereof.

Flow straightener 17 is circumscribed by binding 22 and is of such a size as to form an annular flow passage 23 with the internal periphery of plenum chamber 14. Flow straightener 17 is provided with a flange 24 which extends from straightener 17 past the periphery of the wall means defining plenum chamber 14. The terminus of the wall means defining plenum chamber 14 is provided with air flow deflecting means comprising an outwardly extending flange 25, and flange 24 is so located with respect thereto as to form an outwardly directed extension 26 of annular flow passage 23. Flanges 24 and 25 are so constructed that the axis of outwardly directed extension 26 of flow passage is removed from the axis of each of flow passages 21 by an angle of substantial magnitude.

In the operation of the foregoing apparatus, flow straightener device 17, in combination with flange 24, will be effective to distribute air from plenum chamber 14 into the surrounding space in two streams. The first stream issues from the core of plenum chamber 14 and is directed to a region of application where the purity of the air will be of particular value. The second stream, which will generally be a fraction of the magnitude of the first stream, issues from the peripheral region of plenum chamber and forms a sharply diverging air screen by virtue of the deflection imparted thereto by flange 24. It has been discovered that the distribution of the peripheral portion of the air from plenum chamber 14 as a screen which diverges from the main stream by an angle of substantial magnitude results in a marked reduction in the amount of air entrained from the surroundings by the main stream issuing from the core of plenum chamber 14 for a substantial distance thereafter. The consequence of this is that a moving blanket of air of a purity substantially equal to the purity of the air from the purifying means can be maintained over a surface for a substantial distance from the outlet of the distributor. The magnitude of the angle by which the air screen must diverge from the main stream for a satisfactory entrainment inhibiting effect is preferably at least about 90° since, at such an angle, the air screen with have no component of motion parallel to the main stream. However, any divergence of the screen from the main stream from about 30° to about 105° will have the marked entrainment inhibiting effect needed. The velocity of the main stream of air is preferably in the range of from 200–300 f.p.m. and the velocity of the air screen is preferably from 1.0– 1.5 times the velocity of the main stream.

The width of the area protected by the air blanket from bacteria in surrounding air will initially be equal to the width of the stream issuing through passages 21 of flow straightener and will diminish in width as it recedes from the outlet to form a trapezoid whose nonparallel sides converge to form an angle of about 7-8°. This protected area is illustrated by shading on surface S of FIG. 1, which is disposed immediately downstream of distributor 11, as further shown in FIG. 2. The length of the area protected from bacteria within the space by the blanket of air passing thereover from distributor 11 is determined mainly by the velocities of the moving blanket, the diverging protecting screen, and is also influenced by the ratio of these velocities and by the angle formed between the blanket and the screen. Accordingly, the following example is presented for the purpose of further illustrating and disclosing the invention and is in no way to be considered as a limitation thereon.

*Example*

An air distributor was constructed in accordance with distributor 11 of FIGS. 1-4 wherein binding 22 of flow straightener 17 defined an area 12" by 12". Vertical slats 18 and horizontal slats 19 were located in flow straightener to define a plurality of passages 21, each 1" by 1" by 4" long. The interior periphery of the wall means defining plenum chamber 4 defined, with binding 22, a square annular flow passage of 1" thickness. Flange 24 was so located with respect to flange 25 that the thickness of passage 26 was ⅝". This distributor was mounted with respect to the smooth upper surface of a table according to the relationship between distributor 11 and surface S of FIGS. 1 and 2. A stream of air was treated by intimately contacting it with an aqueous solution of lithium chloride and was passed to the distributor 11 at such a rate that the velocity of the blanket immediately downstream of the outlet of straightener 17 was 225 feet per minute and the velocity of the air screen from passage extension 26 was 300 feet per minute. The velocity of the air blanket at a point 30 inches from the outlet of the distributor was approximately 100 feet per minute. Bacteria readings were taken of the air leaving the treating unit, at a point in the room 6 feet from the table and 2 feet above the floor, and at points along the centerline of the blanket issuing from the distributor 8 inches above the table and 12, 24, 36, and 48 inches from the outlet of the distributor. Bacteria readings were taken by means of a very efficient measuring device known as an Andersen Sampler, which is described at page 39 of Sampling Microbiological Aerosols, Public Health Monograph No. 60, Public Health Service Publication No. 686. Two test runs according to this set-up were made. On the first test run the room air bacteria count was 112, the bacteria count of the air from the treating unit was 0, and the bacteria count of the air blanket flowing over the table surface at the 12, 24, 36, and 48 inch points was, respectively, 1, 6, 3, and 58. On the second test the room air bacteria count was 114, the bacteria count in the air from the treating unit was 0, and the bacteria counts in the air blanket at the 12, 24, 36, and 48 inch points were, respectively, 1, 5, 3, and 43. Additionally, comparative tests using smoke were run on the distributor above described, and on distributors not incorporating means to emit the sharply diverging air screen to inhibit entrainment of room air by the air blanket. These tests indicated the sharply diverging air screen to be necessary to inhibit penetration of the air blanket by room air at distances from the distributor outlet equal to multiples of the width of the distributor.

A typical application for an air distributor according to the foregoing design is in a hospital operating room and is illustrated in FIG. 5 wherein two such distributors, 11a and 11b, are provided. Distributor 11a services the operating table 31 and is mounted on a cart 32 with means to adjust the position, elevation, and angle of discharge of distributor 11a depending on the type of operation being performed. Distributor 11b services instrument table 33 and may be non-adjustably mounted. Air, purified in any appropriate manner by means not shown, is delivered to the operating room by conduit 34 from which air is delivered to distributors 11a and 11b, respectively, by branch conduits 35 and 36 which, necessarily in the case of conduit 35 and preferably in the case of conduit 36, are of flexible construction. FIGURE 6 shows an arrangement wherein distributor 111a, which services operating table 131, receives air by means of a flexible conduit 136 which extends upwardly from the floor.

As will be evident to those skilled in the art, various modifications and alternatives can be made to the foregoing described embodiment of this invention without departing from the spirit or scope of the invention as claimed hereinafter. It is to be expressly noted that the air screen need not be continuous around the periphery of the distributor as where one side of the distributor is in contact with a solid surface which extends away therefrom in the direction of flow of the main stream.

We claim:

1. Apparatus for introducing a stream of gas into a space, comprising a plenum chamber having an inlet, an outlet spaced relative to said inlet, and an axis extending between said inlet and said outlet, means for supplying the gas to said inlet, first directing means disposed at said outlet for directing a portion of said gas in a unidirectional stream parallel to said axis, and second directing means circumposing said first directing means directing a portion of said gas at an outward angle 30 to 105° relative to said axis.

2. The apparatus of claim 1 wherein said angle is for 30° to 105° relative to the direction of said first portion.

3. The apparatus of claim 1 wherein said gas supplying means comprises means to provide purified air.

4. The apparatus of claim 1 wherein said first directing means comprises a first plurality of spaced slats, a second plurality of spaced slats disposed at an angle relative to said first plurality, said first plurality and said second plurality cooperating to define a plurality of flow passages.

5. The apparatus of claim 1 wherein said first directing means comprises a first plurality of spaced slats perpendicular to said outlet and a second plurality of spaced slats, perpendicular to said first plurality of slats and to said outlet, said first and second plurality of slats defining a plurality of parallel flow passages having a generally square cross-section.

6. The apparatus of claim 5 wherein said flow passages have a length in the direction of the axis two to four times greater than the distance between adjacent spaced slats.

7. In a method of distributing a gas into a space, the steps comprising directing a first stream of gas unidirectionally into the space, emitting a second stream of gas into the space from the periphery of said first stream of gas, said second stream of gas circumposing said periphery and being diverted at an outward angle between 30 to 105° relative to the direction of said motion of said first stream of gas, thereby substantially inhibiting the tendency of said first stream of gas to entrain fluid from the space.

8. The method according to claim 7 wherein the first stream of gas, the second stream of gas, and the fluid in the space consist essentially of air.

9. The method according to claim 8 and further comprising the step of subjecting the first stream of gas to a purifying treatment prior to distributing it into the space.

10. The method of maintaining the bacteria level of the air in a localized region in a space at a low level comprising, in combination: subjecting a stream of air to a purifying treatment; unidirectionally emitting a first stream of gas, consisting essentially of at least a portion of the stream of treated air, into the space over the localized region from an area proximate thereto; and emitting a second stream of gas into the space from the periphery of the area of emission of the first stream at an outward angle 30° to 105° relative to the direction said first stream is emitted, thereby substantially inhibiting the tendency of the first stream of gas to entrain air from the space until the first stream has passed beyond the localized region.

11. The method according to claim 10 wherein the second stream of gas consists essentially of at least a portion of the stream of treated air.

12. The method according to claim 10 wherein said outward angle is at least about 90°.

13. The method according to claim 10 wherein the average velocity of the second stream of gas at the area of its emission is a multiple of the velocity of the first stream of gas from 1.0 to 1.5.

References Cited by the Examiner

UNITED STATES PATENTS

| | | | |
|---|---|---|---|
| 3,065,043 | 10/1962 | Kelley | 21—53 X |
| 3,065,685 | 11/1962 | Sylvester et al. | 98—40 |
| 3,107,863 | 10/1963 | Potapenko | 21—53 |

MORRIS O. WOLK, *Primary Examiner.*

JOSEPH SCOVRONEK, *Examiner.*

F. W. BROWN, *Assistant Examiner.*